United States Patent [19]

Uchman et al.

[11] Patent Number: 5,356,341

[45] Date of Patent: Oct. 18, 1994

[54] ENCAPSULATED SPRING FOR A MECHANICAL JOINT

[75] Inventors: Frederick J. Uchman, Clarkston; Theodore H. Collins, Rochester Hills; Mark Van Ophem, Romeo, all of Mich.

[73] Assignee: GKN Automotive, Inc., Auburn Hills, Mich.

[21] Appl. No.: 81,068

[22] Filed: Jun. 22, 1993

Related U.S. Application Data

[63] Continuation of Ser. No. 736,060, Jul. 25, 1991, abandoned.

[51] Int. Cl.⁵ ............................................. F16D 3/16
[52] U.S. Cl. .................................. 464/146; 464/906
[58] Field of Search ............... 464/146, 141, 906, 111, 464/139, 142, 143; 277/212 R, 212 C, 212 F; 242/55.2; 267/170, 174, 179; 403/254, 381, 70, 71

[56] References Cited

U.S. PATENT DOCUMENTS

| | | | |
|---|---|---|---|
| 1,404,464 | 1/1922 | Meyer | 267/170 X |
| 2,287,326 | 6/1942 | Reeves et al. | 267/170 X |
| 2,718,380 | 9/1955 | Muller | 464/906 X |
| 2,842,355 | 7/1958 | Lang | 267/170 X |
| 3,151,551 | 10/1964 | Dutro et al. | 242/55.2 |
| 3,310,960 | 3/1967 | Cull | 464/146 X |
| 3,336,570 | 8/1967 | Tuchel | 403/254 X |
| 3,581,081 | 5/1971 | Rieth | 277/212 R |
| 3,613,396 | 10/1971 | Drevard et al. | 464/111 |
| 3,643,884 | 2/1972 | Curtin | 242/55.2 |
| 4,212,434 | 7/1980 | Walker | 242/55.2 |
| 4,318,282 | 3/1982 | Orain | 464/111 |
| 4,464,143 | 8/1984 | Bowyer | 464/146 |
| 4,522,008 | 6/1985 | Zeigler | 403/71 X |
| 4,767,381 | 8/1988 | Brown et al. | 464/146 |
| 4,795,404 | 1/1989 | Sutton et al. | 464/111 |
| 4,813,808 | 3/1989 | Gehrke | 464/906 X |

FOREIGN PATENT DOCUMENTS 53-9975  1/1978  Japan ..................... 267/170

Primary Examiner—Daniel P. Stodola
Assistant Examiner—Eileen A. Dunn
Attorney, Agent, or Firm—Harness, Dickey & Pierce

[57] ABSTRACT

A constant velocity joint has an encapsulated spring to aid in the resistance to centrifugal forces generated during high speed rotation. The encapsulated spring has first and second mating housing portions and a coil spring biasing the housing portions with respect to one another and the interconnecting shaft with respect to the joint.

4 Claims, 2 Drawing Sheets

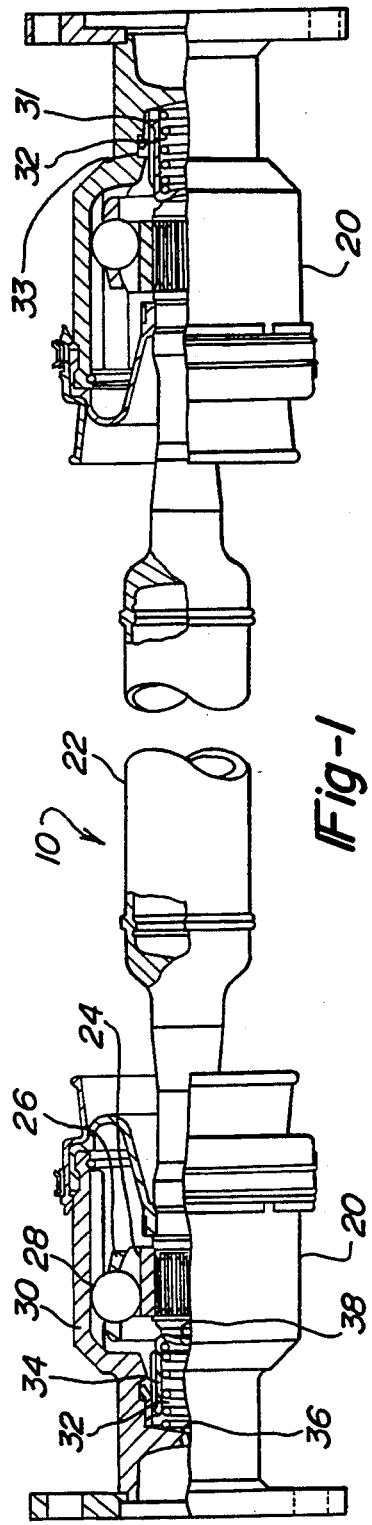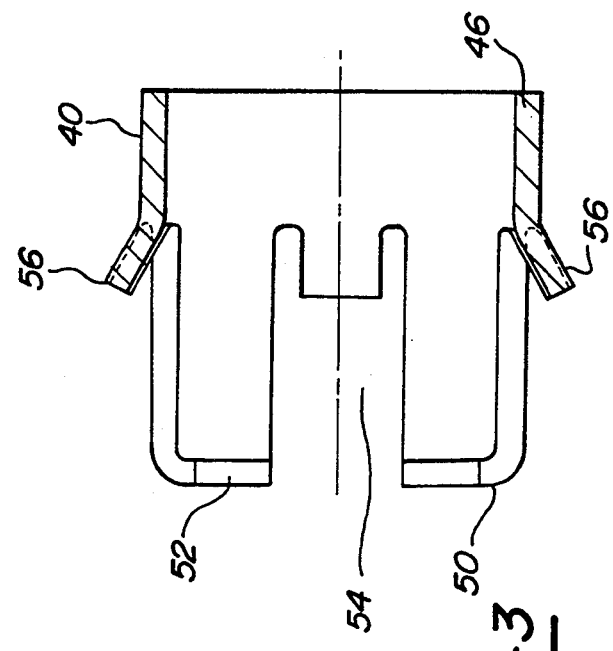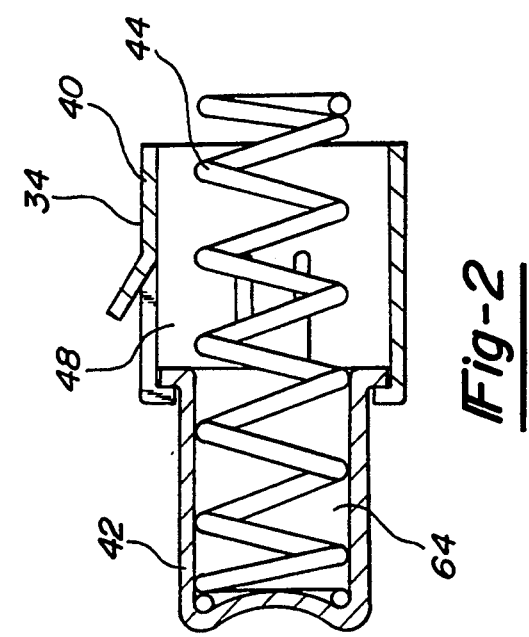

ENCAPSULATED SPRING FOR A MECHANICAL JOINT

This is a continuation division of U.S. patent application Ser. No. 07/736,060, filed Jul. 25, 1991, now abandoned.

BACKGROUND OF THE INVENTION

This invention relates to a constant velocity joint for use in a motor vehicle. Note particularly, this invention relates to an encapsulated spring for the constant velocity joint.

Constant velocity joints have been used in the transportation industry for years. These constant velocity joints can be separated into two classes, fixed joints and plunge joints.

Fixed joints have a fixed center of rotation and have a large angular capability (45°–50°). These joints are usually found at the wheel side of front wheel drive vehicles. The large angular capability of the joint allows the wheel to turn during steering maneuvers.

Plunge joints have a movable center of rotation and are somewhat limited in their angular capability (20°–25°). These joints are usually found at the differential end of front wheel drive vehicles. The angular and plunging capabilities accommodate suspension movement, engine movement and center line changes induced by the geometry of the suspension system during suspension movements.

A typical front wheel drive vehicle has a plunge joint connected to a fixed joint by an interconnecting shaft. This combination of joints is referred to as a halfshaft. There is normally a pair of halfshafts on each vehicle. One for the right hand side and one for the left hand side. These halfshafts drive the wheels and thus rotate at wheel speed.

A similar configuration of halfshafts can be found on most rear wheel drive vehicles with independent rear wheel suspension. The only difference in a rear wheel drive vehicle is that the wheels do not accommodate steering. For these vehicles, it is possible to use two plunge joints for each halfshaft. When using two plunge joints, a mechanism is necessary to position the interconnecting shaft with respect to the two plunge joints. Generally, this is accomplished by providing centering springs between the interconnecting shaft and the plunge joints.

For rear wheel drive vehicles and four wheel drive vehicles, propshafts, which rotate at engine speed, are used to carry the power from the transmission or transfer case to the front or rear differentials. The engine speed is normally greater than the wheel speed due to differential and transmission gear ratios. Propshafts also utilize constant velocity joints to provide the required angular and plunge travel. When two plunge joints are used in a propshaft arrangement, the arrangement requires a mechanism to center the interconnecting shaft. The mechanism is similar to those used in independent rear wheel drives. As mentioned above, centering springs may be used to accomplish the centering.

One design of a centering spring includes a coil spring located in a pocket of the plunge joint outer race. One end of the coil spring rests against the bottom of the pocket and the other end is attached to a metal cup. The metal cup bears against the interconnecting shaft. An identical configuration is used in the joint at the opposite end of the halfshaft or propshaft. The interconnecting shaft is free to float between the two plunge joints, however, it will always be positioned by the reaction of the two centering springs to a position which equalizes the preload on both springs.

One disadvantage encountered with this type of spring centering design, and particularly with the propshaft application, is to maintain the position of the spring between the joint outer race and the interconnecting shaft. As the joint rotates, the spring extends and compresses as the interconnecting shaft floats between the two joints. When the spring is in its extended position, centrifugal force tends to disengage the spring and cup from the interconnecting shaft.

Additional disadvantages are encountered when balancing the halfshaft or propshaft prior to vehicle installation. Normally only propshafts are balanced due to their high speed operation. The unpredictability of the position of the centering spring, due to the centrifugal forces acting on it, produces an inconsistent amount of out of balance and an inconsistent location of out of balance. Thus it is difficult to accurately determine how large of a balancing weight should be applied as well as where it should be placed.

Accordingly it is desirous to have a centering spring which would be less susceptible to the centrifugal forces produced during rotation in order to better balance the assembly. Likewise, it is desirous to have a high degree of confidence that the integrity of the assembly will be maintained during its life.

SUMMARY OF THE INVENTION

The present invention provides the art with an encapsulated spring for use in a constant velocity joint. The encapsulated spring of the present invention provides more rigidity to the system. Thus centrifugal force has less effect on the system during the balancing operations. The present invention also provides a centering spring which is less likely to disengage during joint operation.

From the following detailed description taken in conjunction with the accompanying drawings and claims, other objects and advantages of the present invention will become apparent to those skilled in the art.

DESCRIPTION OF THE DRAWINGS

FIG. 1 is a side elevation view partially in cross section of a constant velocity jointed propshaft assembly including an encapsulated spring in accordance with the present invention.

FIG. 2 is a side elevation view partially in cross section of the encapsulated spring assembly in accordance with the present invention.

FIG. 3 is an enlarged cross section view of a first cylindrical housing portion as in FIG. 2.

DETAILED DESCRIPTION OF THE PREFERRED EMBODIMENT

Figure 4:
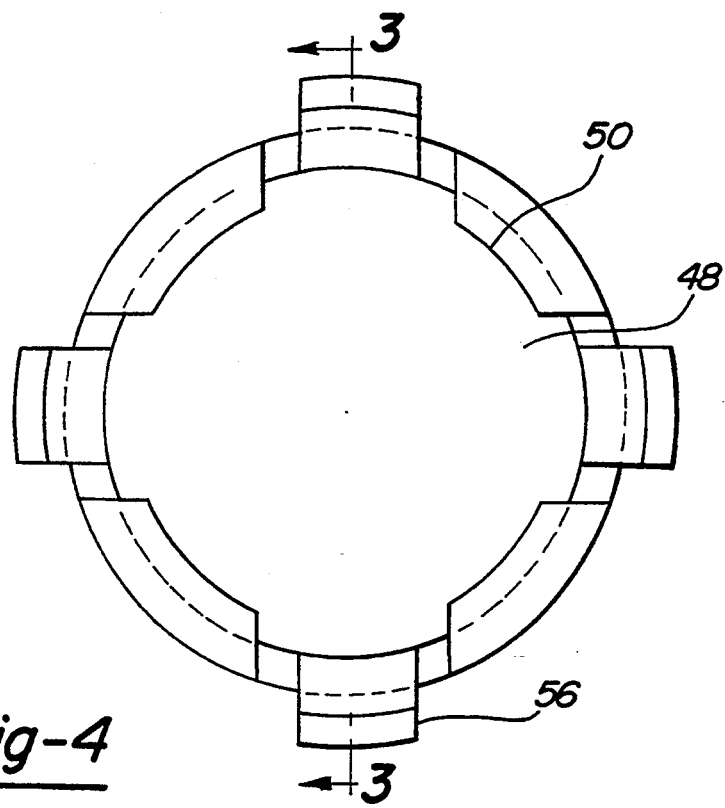
FIG. 4 is an end elevation view of the first cylindrical housing portion shown in FIG. 3.

A constant velocity jointed propshaft assembly is shown in FIG. 1 and is designated by reference numeral 10. The constant velocity joint shown for illustration purposes is of the double offset design. Those skilled in the art, can take the invention herein described and apply it to other types of constant velocity joints.

The propshaft assembly 10 has a pair of constant velocity joints 20 connected by an interconnecting shaft 22. Each constant velocity joint includes an inner race 24, a cage 26, a plurality of balls 28, and an outer race 30. An encapsulated spring assembly 34 is maintained in each joint 20.

The outer race 30 has an inner wall surface 31 which defines an inner cylindrical chamber 32. A retaining groove 33 is machined into the inner wall surface 31 to maintain the encapsulated spring assembly in the joint as will be explained herein. The encapsulated spring assembly 34 is located in chamber 32 and bears against the outer race surface 36 and the interconnecting shaft surface 38.

Refer to FIGS. 2-6 for a better understanding of the encapsulated spring assembly 34. The encapsulated spring assembly 34 includes a first cylindrical housing portion 40, a second cylindrical housing portion 42 and a coil spring 44.

The first cylindrical housing portion 40 has a cylindrical outer wall 46 defining an internal cavity 48. A flange 50 extends radially inward from the housing outer wall 46 to define a circular aperture 52. The aperture 52 enables the second housing portion 42 and coil spring 44 to pass through. Also, the flange 50 provides a stop for the second housing portion 42 to prohibit further axial movement of the second housing portion 42 through the aperture 52.

A plurality of slots 54 and a plurality of tabs 56 are stamped out of wall 46. The tabs 56 extend radially outward from the wall 46 at an angle less than 90° with respect to the wall 46 as shown in FIGS. 3 and 4. The angular tabs 56 cooperate with the retaining groove 33 to maintain the spring assembly 34 within the chamber 32. The tabs 56 are flexed inwardly to pass into the chamber 32 and rebound into the groove 33 to retain the housing as seen in FIG. 1.

Figure 5:
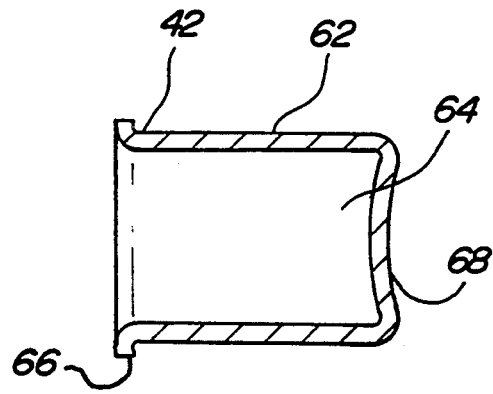
FIG. 5 is an enlarged cross section view of a second cylindrical housing portion as in FIG. 2.
Figure 6:
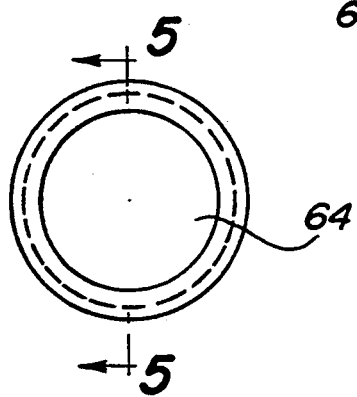
FIG. 6 is an end elevation view of the second cylindrical housing portion shown in FIG. 5.

The second cylindrical housing 42 has a cylindrical outer wall 62 defining an internal cavity 64. A flange 66 extends radially outward from one end of the housing wall 62. The other end of the housing wall 62 is closed and has a partial spherical surface 68 as seen in FIGS. 2 and 5. The outside diameter of the outer wall 62 is slightly less than the diameter of the circular aperture 52 of the housing 40. The second cylindrical housing 42 is inserted into the first cylindrical housing 40 as shown in FIG. 2. The coil spring 44 is located in cavity 48 and cavity 64. This encapsulated spring assembly 34 is then inserted into the cylindrical chamber 32 of the outer race 30 as shown in FIG. 1.

The coil spring 44 is designed to be slightly longer than both the housing portions 40 and 42 as shown in FIG. 2. In this way, when housing portion 40 is positioned in the chamber 32, the coil spring 44 will bias housing portion 42 away from housing portion 40. The flange 66 is shouldered against flange 50 due to the spring pressure and thus maintains the integrity of the assembly.

While the above detailed description describes this preferred embodiment of the present invention, it should be understood that the present invention is susceptible to modification, variation and alteration without deviating from the scope and fair meaning of the subjoined claims.

What is claimed is:

1. A universal joint member for use in a propeller shaft, said universal joint comprising:

an outer race having an open end, a second end, and a first inner wall defining a cavity beginning at said open end and longitudinally extending towards said second end, said outer race further having a second inner wall defining a cylindrical pocket at said second end;

a first cylindrical housing defining a first cylindrical cavity, said first housing having a first end, a second end and a first radially inwardly extending homogenous flange at said first end, said second end of said first housing defining a circular opening in communication with said first cavity;

at least one retaining tab angularly extending from said first cylindrical housing, said retaining tab interacting with said second inner wall to retain said first housing within said cylindrical packet;

a second cylindrical housing having an outside wall defining an outside diameter smaller than said circular opening in said first housing, said second housing insertable through said circular opening in said first housing and located in said first cavity of said first housing, said second housing defining a second cavity and having a first end, a second end, a second homogenous flange extending radially outward from said outside wall at said first end of said second housing, and a third homogenous flange extending radially inwardly from said outside wall at said second end of said second housing, said second homogenous flange having an outside diameter smaller than said circular opening in said first housing; and biasing means for biasing said first housing with respect to said second housing such that said radially inwardly extending first flange of said first housing mates with said radially outwardly extending second flange of said second housing, said biasing means located in said first and second cavities of said first and second cylindrical housings, said first and second cylindrical housings resisting radial movement of said biasing means due to the centrifugal force being exerted on said biasing means due to the high speed rotation of said outer race member.

2. The universal joint member of claim 1 wherein said third homogenous flange incorporates a partial spherical bearing surface.

3. The universal joint member of claim 1 wherein said third homogenous flange closes said second end of said second housing.

4. The universal joint member of claim 1 wherein said biasing means is a coil spring.

* * * * *